No. 885,691.

PATENTED APR. 21, 1908.

J. F. DUNN.
WEED KILLER.
APPLICATION FILED JAN. 20, 1908.

WITNESSES:
F. Sabrmeng
Gertrude Whitehead

INVENTOR:
Joseph Francis Dunn
BY Eugene Ayres,
ATTORNEY.

UNITED STATES PATENT OFFICE.

JOSEPH FRANCIS DUNN, OF ST. JOSEPH, MISSOURI.

WEED-KILLER.

No. 885,691.   Specification of Letters Patent.   Patented April 21, 1908.

Application filed January 20, 1908. Serial No. 411,671.

*To all whom it may concern:*

Be it known that I, JOSEPH FRANCIS DUNN, a citizen of the United States, residing at St. Joseph, in the county of Buchanan and State of Missouri, have invented certain new and useful Improvements in a Weed-Killer; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

15. The object sought by me in this invention is to provide a device especially adapted to kill weeds growing on farm lands, thereby removing one of the greatest obstacles to the growth of crops and largely reducing the amount of cultivation now required to prevent crops being smothered by them.

I accomplish my object by the mechanism illustrated in the accompanying drawings, in which,—

Figure 1:
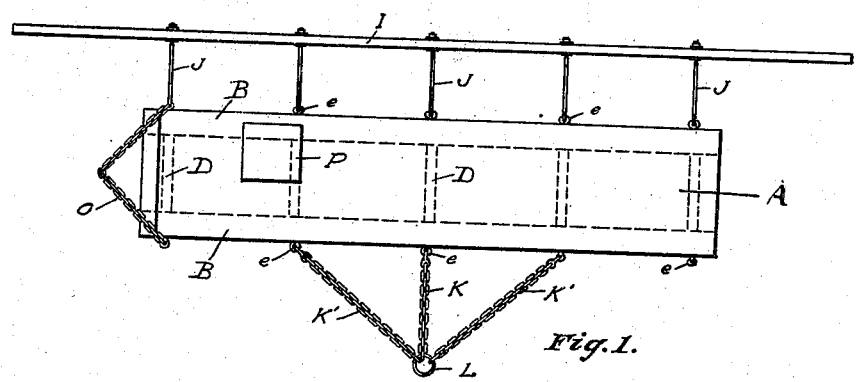
Figure 2:
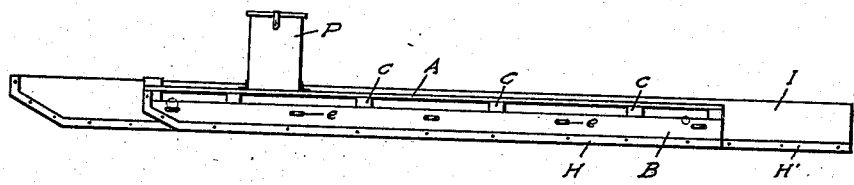
Figure 3:
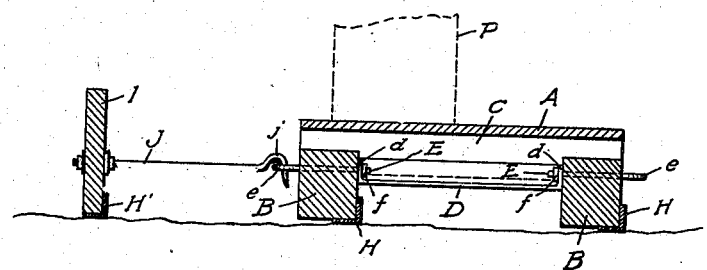

Figure 1 is a top view of the weed killer; Fig. 2, a side view of the same, the chains omitted, and Fig. 3 is a detail cross section of the same.

Similar letters refer to similar parts in the several views.

In the drawings A is the deck of the device preferably about 13½ feet long and 31 inches wide.

B B are runner timbers 6x6 inch lumber being used for same. These runners are held rigidly parallel with each other by bridge timber C C halved down upon and spiked thereto and by 2 inch iron bars D D—. The ends $d$ $d$— of said bars are bent upward at right angles and pierced for the receipt of bolts E E. These bolts are inserted through runners B B from their outer sides and locked into engagement with said bar ends $d$ $d$ by means of nuts $f f$—. The head of each bolt is provided with an eye $e$.

H H are 2x2 angle irons rigidly fastened on the lower front angle of each runner.

I is a brake bar spaced about 17 inches back of the part of the device hereinbefore described. Said brake bar is adapted to take up any inequalities in driving and make sure of killing out all weeds in a space of at least 1 rod wide. It is provided with an angle iron H' located similarly to those on the runners. This brake bar is connected with the device by means of connecting rods J J— having hooked ends $j$ $j$ which engage with bolt eyes $e$ $e$—. A central draft chain K and two chains K' K' have connection with a single ring L, the other end of the central chain connecting at the middle of the front of the device with an eye $e$ while chains K' K' diverge connecting with eyes $e$ $e$ one at each side of the central eye with which chain K engages, as shown in Fig. 1.

A clevis being attached to ring L a team may be attached to the device. Additional chains may be attached to the two eyes nearest the ends, if necessary, to enable additional animals to be attached to the device. By this arrangement of chains inequality of strain on either animal will be prevented. Another chain O is attached to eyes at an end of the device to permit it to be drawn through gateways or other passages that may be too narrow to allow it to pass through in the usual way. On the deck near said end there is a detachable box P serving as a seat and tool or storage chest. As shown in Fig. 2 the angle irons at the end of the device on which box P is attached bear upward at an angle or curve to facilitate the device being drawn over any inequalities or obstructions.

From the foregoing description it will be seen that my device is intended especially for use on ground overgrown with weeds my object being not only to break down the weeds but also to crush and exterminate them and while accomplishing this to also pulverize all clods of earth, thus placing the soil in the finest attainable condition for planting and raising crops.

One or more planters may be attached at the back of the brake-bar so that planting may proceed simultaneously with the destruction of the weeds and pulverizing of the soil.

What I claim and desire to secure by Letters Patent, is:—

1. In a weed killer the combination with front and rear runners set crosswise, a detachable brake-bar spaced backward of said runners, iron bars having turned right angle flat ends thereof between said runners, bolts having nuts to lock said runners and said right angle ends together, eyes in the heads of said bolts, rods and hooked ends thereof to connect said brake-bar with the rear runner, a deck and a seat and storage box thereon, halved bridge timbers carried by said runners, angle irons in corresponding forward position on said runners and brake-bar and chains connected with the front and end of the device, substantially as set forth and shown.

2. In a weed killer the combination of front and rear runners and an angle iron on the bottom front angle of each runner, bars holding said runners spaced rigidly apart, a brake-bar of greater length than the runners detachably connected with and spaced from the rear runner and means for hauling the device either forward or endwise, substantially as shown and set forth.

3. In a weed killer a forward runner, a runner spaced from and rearward of the forward runner, bars connecting said runners, a deck provided with a detachable box for seat and storage, an angle iron rigidly fastened on the lower front angle of each runner, and means for drawing said device, substantially as described and shown.

In testimony whereof I affix my signature, in presence of two witnesses.

JOSEPH FRANCIS DUNN.

Witnesses:
  F. LABUNERIE,
  F. P. CRONKITE.